United States Patent Office 3,163,637
Patented Dec. 29, 1964

3,163,637
ELUTION OF VITAMIN B$_{12}$ FROM CARBOXYLIC RESINS WITH AQUEOUS ALKALIES
Louis Chaiet, Springfield, N.J., assignor to Merck & Co., Inc., Rahway, N.J., a corporation of New Jersey
No Drawing. Filed July 13, 1961, Ser. No. 123,635
3 Claims. (Cl. 260—211.5)

This invention is concerned generally with the recovery of vitamin B$_{12}$-active substances from solutions thereof. More particularly, it relates to a new and improved method for recovering such vitamin B$_{12}$-active compounds from said solutions utilizing resins characterized by the presence of free carboxyl groupings as the adsorbing agents.

This application is a continuation-in-part of my application Serial No. 315,850, filed October 20, 1952, and now abandoned.

By the term vitamin B$_{12}$-active substances, as used herein, is meant vitamin B$_{12}$ itself, a new chemical compound fully characterized in U.S. Patent 2,563,794 and which is now recognized to be a cobalt complex containing a characteristic CN group, and closely related cobalt complexes, which may be referred to as vitamin B$_{12}$ analogs, and which differ from vitamin B$_{12}$ in having some other characteristic group or anion in place of the CN group. Concentrates of vitamin B$_{12}$-active substances derived from liver and from fermentation broths generally contain one or more of the related complexes or analogs in addition to vitamin B$_{12}$ itself, and it is also possible, by chemical reaction, to convert vitamin B$_{12}$ to related complexes or analogs.

The recovery and purification of vitamin B$_{12}$ and vitamin B$_{12}$ analogs from fermentation broths and liver concentrates is difficult since the vitamin B$_{12}$-acetive substances are present in relatively small amounts in proportion to the non-vitamin B$_{12}$-active materials. Reports have appeared on the use of carboxylic acid type ion-exchange resins for purifying vitamin B$_{12}$-active substances, but the processes thus described have not been entirely satisfactory with respect to adsorption of the vitamin B$_{12}$-active materials on the resin, to removal of the materials from the resin, or to both of these aspects of the resin processes.

I have now found, surprisingly enough, that, under certain critical conditions, certain carboxylic-type exchange resins are extremely effective in adsorbing vitamin B$_{12}$-active substances from aqueous solutions, and that, by employing certain preferred eluants, the vitamin B$_{12}$-active substances can be eluted quantitatively from the resin adsorbate. The critical conditions which I employ for adsorbing vitamin B$_{12}$-active substances from solutions include the employment of the carboxylic-type resin substantially completely in its hydrogen form, and the employment of an aqueous solution of said vitamin B$_{12}$-active substance which is at a pH within the range of about 2–3. The critical condition which I have found essential for the quantitative elution of vitamin B$_{12}$-active substances from the resulting resin adsorbate is that the eluant be a basic solution capable of converting the carboxylic-type exchange resin to the salt form. These discoveries, wherein the carboxylic-acid type resin is utilized for the treatment of strongly acid solutions and wherein the resulting resin adsorbate is eluted utilizing an alkaline eluting agent are directly contrary to the long-accepted procedures for adsorption on and elution from cation exchange resins, where adsorption is classically carried out by bring a solution whose pH is in the vicinity of 7 into contact with such a resin in its salt form, and where the elution of the resulting adsorbate is ordinarily conducted employing an acidic solution as the eluant.

Under the foregoing critical conditions, it appears that my procedure does not involve any ion-exchange reactions; it also appears that the mechanisms involved are not, strictly speaking, adsorption and elution. Instead, it is probable that a mechanism at least akin to solid solution formation is involved. Thus, during the operation in which the vitamin B$_{12}$-active material is removed from solution by the resin, the latter is in its hydrogen form and apparently acts as an organic acid solvent for the vitamin B$_{12}$-active substances. During the operation in which the vitamin material is removed from the resin, the resin is converted to a salt form, in which form it is apparently a poor solvent for the vitamin B$_{12}$-active substances, and the latter are therefore readily extracted from the resin salt by the eluant. Of course, I do not wish to be bound by these theoretical considerations.

The cation-exchange resins of the carboxylic type employed in this invention are those formed by copolymerization of divinyl benzene and methacrylic acid, such as described in U.S. Patents 2,319,359; 2,333,754; 2,340,110 and 2,340,111. These resins are characterized by the property of deriving their cation-exchange capacity essentially from carboxylic groups. In the practice of the present invention, I use a resin obtained by the copolymerization of methacrylic acid and divinyl benzene and having a relatively porous structure so as to accommodate the large molecules involved in my process. In copolymers of methacrylic acid and divinyl compounds the porosity is to a large extent dependent upon the degree of cross-linking imparted by the divinyl component. In these copolymers the divinyl component contributes water-insolubility and a certain degree of hardness to the resin but at the same time detracts from the porosity of the resin. It is, therefore, desirable in practicing the present invention with this type of ion-exchange resin to use a resin containing the least amount of divinyl compound that will produce the physical properties required of a cation-exchange material.

The cation-exchange resins I have found to be most efficient in the practice of our process are copolymers of methacrylic acid and divinyl benzene wherein the divinyl benzene component constitutes from 2½ to 5 percent of the resin composition. Larger amounts of divinyl benzene may be used in making the resin but with sacrifice of capacity, and no advantage is to be gained by going beyond a 10% divinyl benzene content.

For the adsorption of vitamin B$_{12}$-active material it is essential that the resin be substantially completely in the hydrogen form. Before using the resin, I prefer to condition it by first washing it with an alkyline solution; the resin is then placed entirely in the hydrogen form by washing with acid.

The presently-invented process is carried out by bringing an aqueous solution containing vitamin B$_{12}$-active substances such as vitamin B$_{12}$, vitamin B$_{12a}$, and the like, said solution having a pH within the range of approximately 2–3, into intimate contact with a divinyl benzene-methacrylic acid cation exchange resin which is substantially completely in its hydrogen form. As set forth hereinabove, it is a critical embodiment of the present invention that the resin employed must be substantially completely in its hydrogen form; the pH of the aqueous solution of vitamin B$_{12}$-active substances is likewise critical and must be within the range of about 2–3 since, at pH values substantially below 2 or above 3, adsorption of vitamin B$_{12}$-active substances by the resin is substantially diminished. The decreased adsorption of vitamin B$_{12}$-active substances from aqueous solutions having a pH below 2 may result from the fact that strongly acid solutions can elute vitamin B$_{12}$-active substances from resin absorbates, whereas the decreased adsorption of vitamin B$_{12}$-active substances from solutions having a pH above 3 is probably due to the fact that, under neutral or alkaline conditions of pH, carboxylic-type exchange resins are converted to the salt form. I do not wish, however, to be bound by the foregoing theoretical explanation.

The adsorption and/or extraction operation is ordinarily carried out by contacting the aqueous solution of the vitamin $B_{12}$-active substances, at a pH of about 2–3, with the hydrogen form of the divinyl benzene-methacrylic acid cation exchange resin for a period of time sufficient to accomplish optimum adsorption of the vitamin $B_{12}$-active substances. The period of time required for optimum adsorption of the vitamin $B_{12}$-active substances is usually within the range of 10 to 30 minutes. The adsorption procedure can be conducted either by slurrying the resin in a solution of the vitamin $B_{12}$-active substances, or, if desired, by passing the solution of vitamin $B_{12}$-active material through a column of the resin.

My adsorption (extraction) procedure is generally applicable for removing vitamin $B_{12}$-active substances from aqueous solutions, as for example, the following: aqueous fermentation broths obtained in the microbiological production of vitamin $B_{12}$-active substances; aqueous concentrates containing vitamin $B_{12}$-active substances obtained in the course of isolating and purifying the vitamins; and the like. From a practical standpoint, it is a preferred feature of my process, utilizing the methacrylic acid-divinyl benzene copolymer exchange resins, that the adsorption of vitamin $B_{12}$-active substances, and concomitant excellent separation of said substances from impurities, is accomplished efficiently from fermentation broths, the most widely used source materials. The vitamin $B_{12}$-active substances are effectively removed from broths produced by fermenting conventional nutrient mediums with a variety of vitamin $B_{12}$-activity producing microorganisms, including *Streptomyces griseus, Bacillus megatherium, Alcaligenes faecalis, Alternaria alevaeca,* Pseudomonas sp., *Mycobacterium smegmatis, Streptomyces fradiae,* and others. It has also been found that vitamin $B_{12}$-active substances may be removed in the same manner from aqueous extracts and digestion products of microorganism cells, sewage sludges, and the like.

Heretofore, elution of vitamin $B_{12}$-active material from carboxylic-type resins had been accomplished using conventional methods of elution. I have found, however, that strongly basic solutions will elute vitamin $B_{12}$-active substances quantitatively from methacrylic acid-divinyl benzene copolymer ion-exchange resins. I have further discovered that, to accomplish such quantitative elution, the eluting solution must contain a sufficient quantity of base to convert the resin substantially completely to the salt form. Moreover, the pH of the eluant should preferably be sufficiently high so that the conversion of the resin to the salt form takes place within a practicable period of time. I ordinarily utilize, as eluant, a solution having a pH above about 10 and, preferably having a pH of 13 or above.

As the basic eluant I utilize solutions of inorganic bases such as aqueous sodium hydroxide, aqueous potassium hydroxide, aqueous trisodium phosphate, aqueous ammonium hydroxide, and the like. These eluants, the aqueous solutions of inorganic bases, not only achieve quantitative elution of vitamin $B_{12}$-active substances, but also result in minimal eluate volumes; moreover, the employment of solutions of inorganic bases as eluants eliminates corrosion, solvent recovery and waste disposal problems.

Elution of the vitamin $B_{12}$-active material from the resin adsorbate, where column operation is employed is preferably carried out by passing the eluant upwardly through the resin-adsorbate at a suitable rate, until the pH of the effluent is above about 9 and the effluent is no longer colored. In batchwise operation, the elution operation is similarly continued until the equilibrium pH is above 9 and colored eluate is no longer obtained. It is desirable to avoid maintaining vitamin $B_{12}$-active substances for prolonged periods of time in contact with a solution having a pH above about 12, since some decomposition of vitamin $B_{12}$-active substances can occur in such strongly basic solutions.

The following examples illustrate methods of carrying out the present invention, but it is to be understood that these examples are given for purposes of illustration and not of limitation.

*Example 1*

A granular copolymer of methacrylic acid and divinyl benzene containing about 5% divinyl benzene is slurried twice with 10% aqueous sodium hydroxide solution, employing one resin volume of solution each time. The resin is placed in an adsorption column, and one resin volume of 10% aqueous sodium hydroxide solution is passed through the resin. Three resin volumes of 10% aqueous hydrochloric acid solution are passed through the resin and the resin column is then washed with water thereby removing sodium chloride and excess hydrochloric acid from the resin. The resin, thus treated, is in the hydrogen form.

A fermentation broth obtained by fermenting a conventional nutrient medium utilizing a vitamin $B_{12}$-activity producing strain of *Streptomyces griseus* is filtered and adjusted to a pH of about 3 with mineral acid. The filtered broth contains an amount of vitamin $B_{12}$-active substances equivalent to about .00004 to .0002% based on broth volume and equivalent to about .002 to .008% based on *dissolved solids*. Sixty resin volumes of this broth is passed through the column of resin at a twenty-minutes superficial contact time. Water is passed through the resin column to remove residual broth. It is found that breakthrough of vitamin $B_{12}$-active substances is on the order of 4%.

A three percent aqueous solution of sodium hydroxide (which may contain a small amount, about 0.01%, of NaCN to convert vitamin $B_{12}$ analogs to vitamin $B_{12}$) is passed through the resin at a sixty-minute contact time until the pH of the effluent is above 9 and the effluent is no longer colored. Several resin volumes of solution are ordinarily required. This procedure results in a substantially quantitative elution of vitamin $B_{12}$-active material from the resin. The vitamin $B_{12}$-active substances in the eluate are about 0.2–0.8% pure (based on the solids content of the eluate).

*Example 2*

The procedure described in Example 1 hereinabove is repeated except that two columns of the resin, each containing the same volume of resin as that contained in the column used in Example 1, are connected in series; an amount of the filtered broth equal to twice that used in Example 1 is passed in series through the two resin columns. Under these conditions of operation the breakthrough of vitamin $B_{12}$-active material is only about 1%. About 85–90% of the vitamin $B_{12}$-active substances are adsorbed by the first column of resin, and the remainder is adsorbed by the second column. The second column may then be employed as the first column for further removal of active substances, until sufficiently loaded. Active substances are removed from the columns as above described, the recovery therefrom being substantially quantitative and the purity of the vitamin $B_{12}$-active substances in the eluate being, also, about 0.2–0.8%.

*Example 3*

An eluate containing vitamin $B_{12}$-active substances and obtained as described in Example 1 hereinabove is adjusted to pH 3 with mineral acid and the precipitate of impurities which forms is removed by filtration. The filtered solution is passed through a column containing the resin employed in Example 1, in the hydrogen form. The amount of resin is $\frac{1}{10}$ of one resin volume as there employed, and the contact time is about forty minutes. The vitamin $B_{12}$-active material is eluted from the resulting resin-adsorbate utilizing aqueous sodium hydroxide solution in the manner described in Example 1. The eluate is adjusted to pH 3 with mineral acid, and the precipitate of impurities which forms is removed by filtration. The filtered solution is extracted three times with 1/10 volume of 1:2 cresol-carbon tetrachloride. To the combined extracts are added 2 volumes (based on the volume of the extracts) of acetone and two volumes of diethyl ether. The precipitate which forms is recovered by filtration and dried to give a concentrate containing approximately 10–15% of vitamin $B_{12}$-active material.

*Example 4*

A granular copolymer of methacrylic acid and divinyl benzene containing about 5% divinyl benzene is slurried twice with 10% aqueous sodium hydroxide solution, employing one resin volume of solution each time. The resin is placed in an adsorption column, and one resin volume of 10% aqueous sodium hydroxide solution is passed through the resin. Three resin volumes of 10% aqueous hydrochloric acid solution are passed through the resin and the resin column is then washed with water thereby removing sodium chloride and excess hydrochloric acid from the resin. The resin, thus treated, is in the hydrogen form.

A fermentation broth obtained by fermenting a conventional nutrient medium utilizing a vitamin $B_{12}$-activity producing strain of *Bacillus magatherium* is filtered and adjusted to a pH of about 3 with mineral acid. The filtered broth contains an amount of vitamin $B_{12}$-active substances equivalent to about 0.00002 to 0.0001% based on broth volume. Fifty resin volumes of this broth is passed through the column of resin at a ten-minute superficial contact time. Water is passed through the resin column to remove residual broth. It is found that breakthrough of vitamin $B_{12}$-active substances is on the order of 4%.

A three percent aqueous solution of potassium hydroxide (which may contain a small amount, about 0.01%, of NaCN to convert vitamin $B_{12}$ analogs to vitamin $B_{12}$) is passed through the resin at a sixty-minute contact time until the pH of the effluent is above 9 and the effluent is no longer colored. Several resin volumes of solution are ordinarily required. This procedure results in a substantially quantitative elution of vitamin $B_{12}$-active material from the resin; the vitamin $B_{12}$-active substances in the eluate are about 0.2–0.8% pure (based on the solids content of the eluate).

*Example 5*

A granular copolymer of methacrylic acid and divinyl benzene containing about 5% divinyl benzene is slurried twice with 10% aqueous sodium hydroxide solution, employing one resin volume of solution each time. The resin is placed in an adsorption column, and one resin volume of 10% aqueous sodium hydroxide solution is passed through the resin. Three resin volumes of 10% aqueous hydrochloric acid solution are passed through the resin and the resin column is then washed with water thereby removing sodium chloride and excess hydrochloric acid from the resin. The resin, thus treated, is in the hydrogen form.

A fermentation broth obtained by fermenting a conventional nutrient medium utilizing a vitamin $B_{12}$-activity producing strain of *Alcaligenes faecalis* is filtered and adjusted to a pH of about 3 with mineral acid. The filtered broth contains an amount of vitamin $B_{12}$-active substances equivalent to about 0.00001 to 0.00005% based on broth volume. Fifty resin volumes of this broth is passed through the column of resin at a ten-minute superficial contact time. Water is passed through the resin column to remove residual broth. It is found that breakthrough of vitamin $B_{12}$-active substances is on the order of 4%.

A three percent aqueous solution of ammonium hydroxide (which may contain a small amount, about 0.01%, of NaCN to convert vitamin $B_{12}$ analogs to vitamin $B_{12}$) is passed through the resin at a sixty-minute contact time until the pH of the effluent is above 9 and the effluent is no longer colored. Several resin volumes of solution are ordinarily required. This procedure results in a substantially quantitative elution of vitamin $B_{12}$-active material from the resin. The vitamin $B_{12}$-active substances in the eluate are about 0.2–0.8% pure (based on the solids content of the eluate).

Various changes and modifications may be made in carrying out the present invention without departing from the spirit and scope thereof. Insofar as these changes and modifications are within the purview of the annexed claims, they are to be considered as part of my invention.

What is claimed is:

1. In the process of recovering vitamin $B_{12}$-active material from impure aqueous solutions thereof, the step that comprises contacting a resin-adsorborate comprising a cation-exchange, divinyl benzene-methacrylic acid copolymer resin, said resin being substantially completely in its hydrogen form and having vitamin $B_{12}$-active material adsorbed thereon, said vitamin $B_{12}$-active material having been adsorbed from an aqueous solution thereof having a pH within the range of about 2–3, with an aqueous alkaline solution that is free of organic solvents, thereby converting said resin to the salt form and eluting the vitamin $B_{12}$-active material therefrom.

2. In the process of recovering vitamin $B_{12}$-active material from impure aqueous solutions thereof, the step that comprises contacting a resin-adsorbate comprising a cation-exchange, divinyl benzene-methacrylic acid copolymer resin, said resin being substantially completely in its hydrogen form and having vitamin $B_{12}$-active material adsorbed thereon, said vitamin $B_{12}$-active material having been adsorbed from an aqueous solution thereof having a pH within the range of about 2–3, with 3% aqueous sodium hydroxide, thereby converting said resin to the salt form and eluting the vitamin $B_{12}$-active material therefrom.

3. In the process of recovering vitamin $B_{12}$ from impure aqueous solutions thereof, the step that comprises contacting a resin-adsorbate comprising a cation-exchange, divinyl benzene-methacrylic acid copolymer resin, said resin being substantially completely in its hydrogen form and having vitamin $B_{12}$ adsorbed thereon, said vitamin $B_{12}$-active material having been adsorbed from an aqueous solution thereof having a pH within the range of about 2–3, with 3% aqueous sodium hydroxide, thereby converting said resin to the salt form and eluting the vitamin $B_{12}$ therefrom.

References Cited by the Examiner

UNITED STATES PATENTS

| | | | |
|---|---|---|---|
| 2,628,186 | 2/53 | Shive | 167—81 |
| 2,996,430 | 8/61 | Lightfoot | 260—211.5 |

LEWIS GOTTS, *Primary Examiner.*

T. E. LEVOW, IRVING MARCUS, *Examiners.*